Aug. 5, 1930.  M. BATTEGAY  1,772,302
PROCESS FOR THE MANUFACTURE OF NITRIC ACID
Filed Feb. 3, 1927
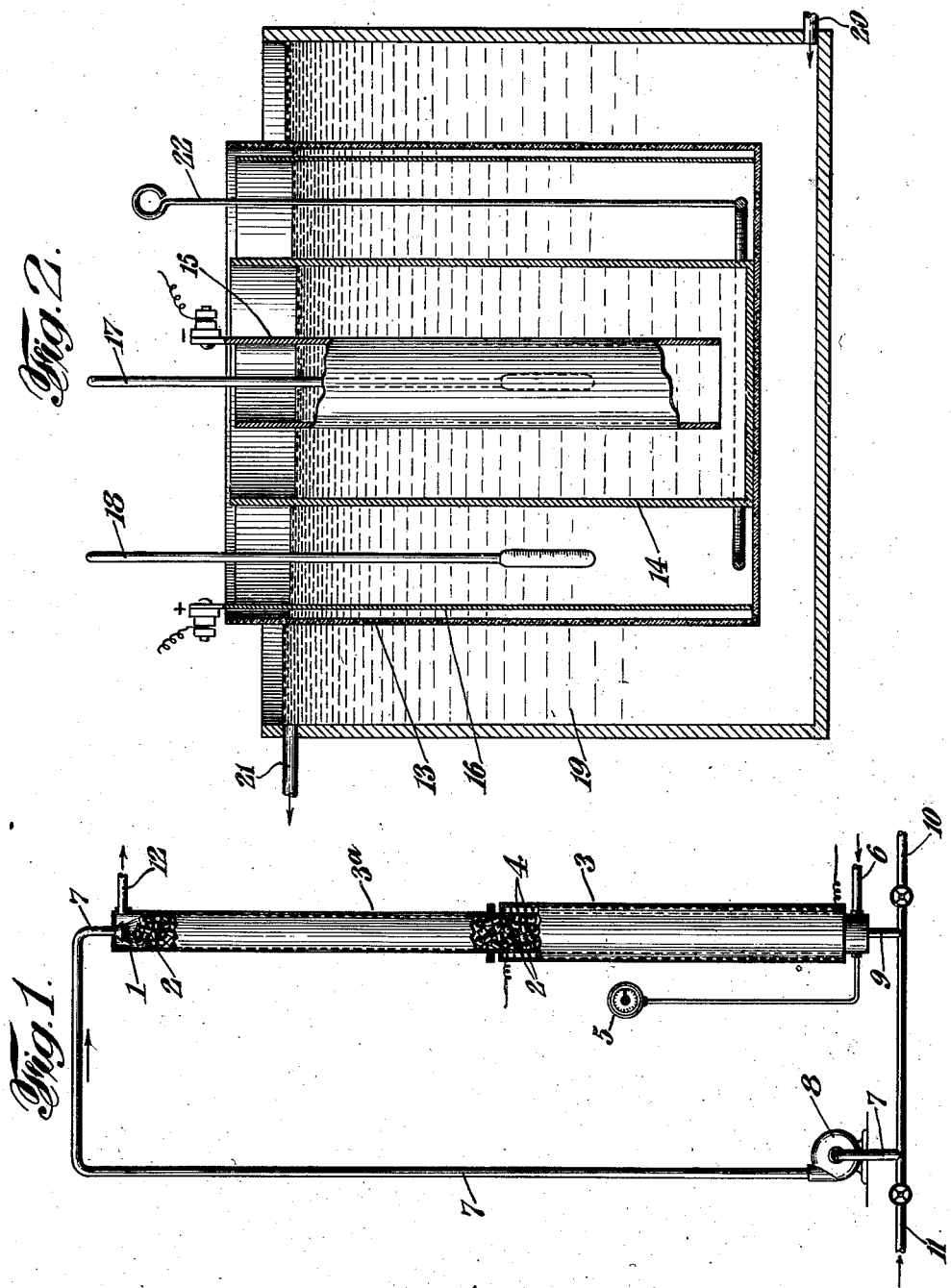
Martin Battegay  Inventor
By his Attorneys
Prindle, Wright, Neal & Bean Patented Aug. 5, 1930

1,772,302

UNITED STATES PATENT OFFICE

MARTIN BATTEGAY, OF MULHOUSE, HAUT RHIN, FRANCE, ASSIGNOR, BY MESNE ASSIGNMENTS, TO THE CALCO CHEMICAL COMPANY, INC., A CORPORATION OF DELAWARE

PROCESS FOR THE MANUFACTURE OF NITRIC ACID

Application filed February 3, 1927, Serial No. 165,593, and in France October 19, 1926.

My invention relates particularly to an improved process for the manufacture of nitric acid, and has relation to the manufacture of nitric acid generally, but has especial application to the manufacture of nitric acid from mixtures made by absorbing nitrogen peroxide in sulphuric acid.

The object of my invention is to provide a process for the manufacture of nitric acid having many advantages over previous processes. The object of my invention is to provide an improved process for the manufacture of nitric acid, and particularly mixtures containing the same, based on the conversion of nitrosyl sulphuric acid to nitric acid, but it has relation, also, especially to the manufacture of nitric acid from mixtures in which the nitrosyl sulphuric acid has been made by introducing nitrogen peroxide, $N_2O_4$, into sulphuric acid.

Hitherto, in the manufacture of nitric acid from peroxide of nitrogen by absorbing peroxide of nitrogen in water, reactions occur, the result of which may be indicated by the following reactions:

$$2NO_2 + O + H_2O = 2HNO_3$$
$$6NO_2 + 3H_2O = 3HNO_3 + 3HNO_2$$
$$3HNO_2 = 2NO + HNO_3 + H_2O$$

In other words, there is always in that process an intermediate formation of nitrous acid which, being unstable, forms for every mole of water and every mole of nitric acid, two moles of nitric oxide, NO. The nitric oxide must then be reoxidized and reabsorbed to prevent considerable losses of oxides of nitrogen and, consequently, poor yield of nitric acid. The processes based on the absorption of nitrogen peroxide in water are difficult and complex. They are expensive and cumbersome, not only because of the initial cost of the apparatus but, also, because the upkeep is high in those processes.

The present invention is directed, therefore, to overcoming these difficulties and this I have accomplished by discovering that nitrosyl sulphuric acid, and especially nitrosyl sulphuric acid formed by the solution of nitrogen peroxide in sulphuric acid of the proper concentration, can be readily oxidized notwithstanding its great stability therein. I may carry out such oxidation, either by the introduction of atmospheric oxygen or pure oxygen, any one or more of which sources of oxygen may be used alone or together with one or more other gases or liquids or inert materials. Or such oxidation may be carried out by the use of any other oxidizing agent or agents. Or, instead, I may carry out the process by means of electrolysis. These oxidation processes, either by the use of electrolysis or the introduction of oxygen, or both, can be carried out in the presence or absence of catalysts, as desired, as, for example. with the aid of materials containing vanadium, chromium, cerium, etc., such as ammonium metavanadate, $NH_4VO_3$, chromic anhydride, $CrO_3$, cerium dioxide, $CeO_2$, etc. The general final reaction of the oxidation of the nitrosyl sulphuric acid can be represented as follows:

$$HNSO_5 + O + H_2O = HNO_3 + H_2SO_4$$

showing that the concentration of the sulphuric acid is increased accordingly, and that the sulphuric acid originally used in the process is substantially completely recovered.

Also, if desired, the oxidation of the nitrosyl sulphuric acid into sulphuric acid and nitric acid can be carried out in spent sulphuric acid such as is obtained in the nitration of organic compounds by means of nitrogen peroxide in the presence of sulphuric acid, or by means of mixed acids obtained by absorbing nitrogen peroxide in sulphuric acid, or in spent acids obtained from other nitrating processes. When nitrogen peroxide is dissolved in sulphuric acid, the former acts like a mixed anhydride of nitrous and nitric acid, as set forth in the following reaction:

$$N_2O_4 + H_2SO_4 \rightleftarrows HNSO_5 + HNO_3$$

which is reversible, giving free nitric acid and nitrosyl sulphuric acid. In bringing about this reaction the concentration and temperature of sulphuric acid should be such as to insure absorption of $N_2O_4$ and avoid the loss of oxides of nitrogen. For example, the concentration of sulphuric acid should be above about 70% by weight and the temperature should not be above 30° C.

The oxidation by the introduction of oxygen in one of its forms as above referred to, or mixed with any one of the above kinds of materials, can be carried out in any suitable apparatus permitting the intimate contact of the sulphuric acid containing nitrosyl sulphuric acid with the oxygen. For instance, for this purpose I may use a vertical column provided with Raschig rings, or other suitable filling materials in which the sulphuric acid liquor descends against a countercurrent of ascending oxidizing gases. The temperatures used in the column will depend upon the concentrations of the sulphuric acid and nitrosyl sulphuric acid, conditions being chosen so as to avoid any substantial decomposition or volatilization of the nitric acid formed.

Instead, if desired, the oxidation may be carried out by electrolysis. Electrolysis of a solution of nitrosyl sulphuric acid in sulphuric acid has been mentioned by A. Gurcmann (Zeit. für Anorg. Chemie (1894) vol. 7, p. 161), in which he refers to the dissociation of the nitrosyl sulphuric acid into anions, $SO_4^=$, and into cations which, when discharged liberate hydrogen and nitric oxide, NO, which hydrogen and nitric oxide can be collected. The anions discharged at the anode give some oxygen and sulphuric acid, and the oxygen can also be collected. In his work with sulphuric acid of 1.837 S. G., and containing 0.00316 gram of nitrous anhydride, $N_2O_3$, per cubic centimeter, he obtained nitric oxide, NO, with a loss of 16% of nitrogen compounds; with sulphuric acid of 1.65 S. G., and containing 0.00326 gram of nitrous anhydride, $N_2O_3$, per cubic centimeter, the formation of nitric oxide was not as smooth and there was a loss of 25.3% of nitrogen compounds.

Also, sulphuric acid can undergo a different electrolysis as shown by Berthelot in Comptes Rendus (1892) vol. 114, p. 836, giving $HSO_4^-$, the formation of which is favored by a higher concentration of the acid with a low temperature and a high current density at the anode, the formation being as follows:

$$H_2SO_4 = HSO_4^- + H^+$$

The discharged anion, $HSO_4^-$, thus formed reacts either with itself to form persulphuric acid, $2HSO_4^- = H_2S_2O_8$, or with water to form sulphuric acid and oxygen, $$2HSO_4^- + H_2O = 2H_2SO_4 + O.$$

The conditions favorable to the formation of persulphuric acid, which is a powerful oxidizing agent, were also studied by other authors (K. Elbs and O. Schönherr, Z. für Elekt. Chemie vol. 1, p. 45, 415, 468, 473 (1894)).

I have discovered that nitric acid may be successfully produced by the oxidation of nitrosyl sulphuric acid in sulphuric acid liquors by means of electrolysis, and that such process may be readily carried out in an economical manner by operating under appropriate conditions with suitable electrodes. Also, I have discovered that the conditions which favor the formation of $HSO_4^-$ and persulphuric acid, when electrolyzing pure sulphuric acid alone, favor the formation of nitric acid, in electrolyzing nitrosyl sulphuric contained in solution in sulphuric acid. That is to say, by controlling the conditions of electrolysis so as to favor the abundant formation and discharge of the anions, $SO_4^=$ or $HSO_4^-$, the following oxidation processes take place:

$$2HNSO_5 + 2SO_4^= + 4H_2O = 2HNO_3 + 4H_2SO_4$$
$$2HNSO_5 + 4HSO_4^- + 4H_2O = 2HNO_3 + 6H_2SO_4$$

or $$2HNSO_5 + 2H_2S_2O_8 + 4H_2O = 2HNO_3 + 6H_2SO_4$$

My invention is capable of being carried out in many different ways but for the purpose of illustration I shall describe only certain ways of carrying out the same hereinafter, and it is also capable of being carried out in connection with many different types of apparatus but for the purpose of illustration I have shown only certain types of apparatus for use in connection therewith in the accompanying drawings, in which—

Figure 1 is a diagrammatic representation of an apparatus for use in accordance with my invention, based upon the introduction of oxygen in one or more of its forms for effecting the oxidation; and Figure 2 is a diagrammatic representation of an apparatus which may be used in carrying out my invention when using electrolysis in connection therewith.

For example, in carrying out my invention without electrolysis, and when using an apparatus such as is shown in Figure 1, I may proceed as follows:

*Example 1*

A solution of 92 parts by weight of nitrogen peroxide in 773 parts by weight of 84.5% strength sulphuric acid of a specific gravity of $d = 1,780$, or a spent acid of obtained in nitration containing about the same percentage of nitrosyl sulphuric acid, that is to say 14.7% by weight of nitrosyl sulphuric acid, is circulated from the top to the bottom in a vertical column 1 made of an acid-proof material, such, for example, as ferrosilicon, and provided wth a filling material, such, for example, as Raschig rings 2 of earthenware or porcelain. Although the dimensions of the column may be varied, the column may, for example, be 6 meters in height and the diameter at the inside may be 30 centimeters, said column consisting of a lower section 3, the height of which is 3 meters, and an upper section 3ª which is 3 meters high. The section 3 may be heated by any suitable means, for instance, an electric resistance heater 4, or in any other way, so as to heat the liquid in the lower section 3 to a temperature varying between 60 and 110° C., as shown by a recording thermometer 5. Through an inlet pipe 6 at the bottom of the column 1 a pure and well-dried current of oxygen is introduced and ascending meets the descending liquid which is fed into the top of the column. The liquid is supplied through a pipe 7, having a pump 8, communicating with an outlet pipe 9 at the bottom of the column having a valved branch pipe 10 for the ultimate drawoff of the liquid from the column, and a valved branch inlet pipe 11 for the introduction of fresh liquid to be treated. The descending liquid in the column 1 cools the ascending gas in the upper part of the column 3ª and consequently reabsorbs any oxides of nitrogen which may be given off and carried along in the column. Such cooling may be assisted by the outside air, as shown in the drawing, or by any other suitable cooling means. The oxygen gas is preferably used in such excess that there is a substantially complete absence of oxide of nitrogen at the gas outlet 12 provided at the top of the column. If desired, the excess of oxygen can be recovered and used over again, or it may be used in any desired way. The rate of flow of the oxygen introduced is such that with the cooling provided, the temperature at the upper part of the column and in the exit gases does not exceed 15 to 20° C. Furthermore, the upper part of the section 3ª is substantially free from unabsorbed red fumes of nitrogen peroxide. These fumes may, however, appear in the portion of the section 3ª of the column adjacent to the heated section 3. It will be understood, also, that the rate of flow of sulphuric acid liquor is dependent upon the height of the column, and the temperature used in the heated section. In the above column, which is 6 meters in height, with the lower section heated to 80° C., and when sulphuric acid liquor of the above composition has circulated for two hours at such a rate that the volume of the acid has passed twice through the column, that is to say when the column is operated as above described, a sample of the acid shows 67,58% oxidation of the nitrosyl sulphuric acid originally present. After three hours of circulation of the same, 82.3% of nitrosyl sulphuric acid have been oxidized to nitric acid and a little later the oxidation can be considered as substantially complete. The mixture of nitric and sulphuric acid obtained can be used in the usual nitration processes, if desired, or instead, if desired, the nitric acid can be extracted by any one of the known methods, such, for instance, as distillation.

*Example 2*

In this example of my invention the process may be carried out just as described in connection with Example 1 except in this instance atmospheric oxygen of air is used instead of the oxygen there described, and very similar results are obtained by conducting the process otherwise the same as in Example 1 except for the lengthening of the time of circulation by about 50% of the time described in connection with Example 1.

*Example 3*

In this example of my invention the process is carried out the same as in Example 2 except that to each liter of sulphuric acid liquor there is added 2 cubic centimeters of 0.2% solution in water of ammonium metavanadate, and except, also, that in this instance the time cycle is shortened to about two-thirds of the time set forth under Example 2.

*Example 4*

In carrying out my invention in accordance with this example I proceed exactly the same as under Example 2 except, instead, I use, in place of the air, an oxygen gas mixed with 50% of its weight of nitrogen or carbon dioxide, the results obtained being substantially the same.

*Example 5*

In carrying out my process by the electrolytic oxidation of the sulphuric acid solution of nitrosyl sulphuric, I preferably make use of an electrolytic cell such as is hereinafter described in detail. This is preferably provided with thermometers, stirring and cooling means, as well as two acid-proof electrodes, which may be made of lead, platinum or ferrosilicon or other suitable material, and is provided with a cathode compartment to receive sulphuric acid separated by a porous diaphragm from the anode compartment, the anode compartment containing nitrosyl sulphuric acid dissolved in sulphuric acid of a concentration favorable for the formation of anions, $SO_4^=$ and $HSO_4^-$, and to the economical conductivity of the electric current. When using this electrolytic cell it will be understood that the catalysts may or may not be used, as desired, and that the temperatures employed will depend upon the concentration of the sulphuric acid and of the nitrosyl sulphuric acid, and on the amperage per square inch, as well as the voltage at the electrodes. For this purpose I may use an electrolytic cell comprising a glass or earthenware vessel 13 of about 1 liter capacity, in which is placed in the center of the same, a cylindrical cell 14 made of a porous material such, for example, as earthenware, and having a diameter of about 5 centimeters and a capacity of about 250 cc. This acts as a diaphragm and protects the cathode compartment inside of the same, in which is placed a cathode 15 consisting of a cylindrical tube 1.8 centimeters in diameter and 10 centimeters in length, and which may be made, for example of sheet lead 1 millimeter thick. An anode 16, which surrounds the cylindrical cell 14, is of a hollow cylindrical construction, has a diameter of 9.2 centimeters, and has an inner surface of about 290 square centimeters. The anode 16 can be made of sheet platinum or of ferrosilicon, if desired. The distance between the two electrodes is about 3.7 centimeters. Thermometers 17 and 18 may be provided in the cell. Also, a suitable cooling bath 19 may be provided, supplied with cooling water by inlet and outlet pipes 20 and 21. A stirrer 22 may be used also, if desired. The cylindrical cell 14 is loaded with 200 cc. of 73% strength sulphuric acid and the anode compartment outside of the same is provided with 420 cc. of sulphuric acid liquor containing 14.4% by weight of nitrosyl sulphuric acid and 12.6 by weight of water, and 73% by weight of sulphuric acid. For the electrolysis I may then use a current of 2.6 amperes and 3.5-4 volts giving a current density at the anode of, preferably, not above 1 ampere per $dm^2$, at a temperature of 40° C. Progressive oxidation takes place, as is shown by samples taken every hour. About 68% by weight of the nitrosyl sulphuric acid is oxidized to nitric acid after 7 hours with an efficiency of 94.4% based on the theoretical ampere hours.

*Example 6*

In this example of my invention I proceed the same as under Example 5 except that in this instance I use 460 cc. of sulphuric acid liquor containing 4.3% by weight of nitrosyl sulphuric acid, 13.7% by weight of water, 82% by weight of sulphuric acid, which are electrolyzed by a current of 1-2 amperes and 3-4 volts, at a temperature of 23° C., and in spite of the poor conductivity of the acid used, 30% by weight of the nitrosyl sulphuric acid are oxidized in a few hours to nitric acid.

*Example 7*

In this example of my invention I proceed the same as under Example 6 except that I introduce 2 cc. of a 0.2% by weight solution of ammonium metavanadate, $NH_4VO_3$, in water. Accordingly, it is found that 33% by weight of the nitrosyl sulphuric acid are oxidized into nitric acid in the time mentioned under Example 6.

While I have described my invention above in detail I wish it to be understood that many changes may be made therein without departing from the spirit of the same.

I claim:

1. The process which comprises forming nitric acid by the electrolytic oxidation of nitrosyl sulphuric acid in an anode liquid containing at least 70% by weight of sulphuric acid, with the aid of a cathode liquid containing at least 70% by weight of sulphuric acid.

2. The process which comprises forming nitric acid by the oxidation, in the presence of a catalyst, of nitrosyl sulphuric acid in a liquid containing at least 70% by weight of sulphuric acid.

3. The process which comprises forming nitric acid by the oxidation, in the presence of a vanadium compound adapted to act as a catalyst, of nitrosyl sulphuric acid in a liquid containing at least 70% by weight of sulphuric acid.

In witness whereof I have hereunto signed my name this 2nd day of December 1926.

MARTIN BATTEGAY.